(12) United States Patent
Bae (10) Patent No.: US 11,722,803 B2
(45) Date of Patent: Aug. 8, 2023

(54) RAMP SIGNAL GENERATOR AND IMAGE SENSOR INCLUDING THE SAME

(71) Applicant: SK hynix Inc., Gyeonggi-do (KR)

(72) Inventor: Hyuen Hee Bae, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/849,051

(22) Filed: Jun. 24, 2022

(65) Prior Publication Data

US 2023/0199344 A1 Jun. 22, 2023

(30) Foreign Application Priority Data

Dec. 21, 2021 (KR) .......................... 10-2021-0183738

(51) Int. Cl.
*H04N 25/71* (2023.01)
*H04N 25/75* (2023.01)
*H04N 25/709* (2023.01)
*H04N 25/772* (2023.01)

(52) U.S. Cl.
CPC ........... *H04N 25/75* (2023.01); *H04N 25/709* (2023.01); *H04N 25/745* (2023.01); *H04N 25/772* (2023.01)

(58) Field of Classification Search
None
See application file for complete search history.

(56) References Cited

U.S. PATENT DOCUMENTS

2018/0123608 A1  5/2018  Asayama et al.
2018/0205897 A1* 7/2018  Kim ..................... H04N 25/778

* cited by examiner

*Primary Examiner* — Mark T Monk
(74) *Attorney, Agent, or Firm* — IP & T Group LLP (57) ABSTRACT

Disclosed is a ramp signal generator including a resistance circuit coupled to a first voltage terminal and an output terminal and adjusting, according to a plurality of control signals, a resistance value applied to the output terminal, a ramp signal being output through the output terminal, and a current circuit coupled to a second voltage terminal and the output terminal and for adjusting, according to a clock signal, a current level applied to the output terminal and a change rate of the current level, wherein the plurality of control signals are generated according to an analog gain having a multiple range, and wherein the clock signal has a first frequency when the analog gain has a first range within the multiple range and has a second frequency when the analog gain has a second range within the multiple range.

13 Claims, 5 Drawing Sheets

RAMP SIGNAL GENERATOR AND IMAGE SENSOR INCLUDING THE SAME

CROSS-REFERENCE TO RELATED APPLICATION(S)

This application claims priority under 35 U.S.C. § 119 to Korean Patent Application No. 10-2021-0183738, filed on Dec. 21, 2021, the disclosure of which is incorporated herein by reference in its entirety.

BACKGROUND

1. Field

Various embodiments of the present disclosure relate to a semiconductor design technique, and more particularly, to an image sensor including a ramp signal generator.

2. Description of the Related Art

Image sensors are devices for capturing images using the property of a semiconductor which reacts to light. Image sensors may be roughly classified into charge-coupled device (CCD) image sensors and complementary metal-oxide semiconductor (CMOS) image sensors. Recently, CMOS image sensors are widely used because the CMOS image sensors can allow both analog and digital control circuits to be directly implemented on a single integrated circuit (IC).

SUMMARY

Various embodiments of the present disclosure are directed to an image sensor that may generate an optimized ramp signal when an analog gain is adjusted.

In accordance with an embodiment of the present disclosure, a ramp signal generator may include: a resistance circuit coupled to a first voltage terminal and an output terminal and suitable for adjusting, according to a plurality of control signals, a resistance value applied to the output terminal, a ramp signal being output through the output terminal; and a current circuit coupled to a second voltage terminal and the output terminal and suitable for adjusting, according to a clock signal, a current level applied to the output terminal and a change rate of the current level, wherein the plurality of control signals are generated according to an analog gain having a predetermined multiple range, and wherein the clock signal has a first frequency when the analog gain has a first range within the predetermined multiple range and has a second frequency when the analog gain has a second range within the predetermined multiple range.

In accordance with an embodiment of the present disclosure, an image sensor may include: pixel array suitable for generating pixel signals; a ramp signal generator suitable for: generating a ramp signal through an output terminal by adjusting, according to a plurality of control signals and a clock signal, a resistance value applied to the output terminal and a change rate of a current level applied to the output terminal when an analog gain has a first range within a predetermined multiple range, and generating the ramp signal through the output terminal by adjusting, according to the plurality of control signals and the clock signal, only the resistance value when the analog gain has a second range in the predetermined multiple range; and a signal converter suitable for reading out the pixel signals on the basis of the ramp signal.

In accordance with an embodiment of the present disclosure, an image sensor may include: a timing controller configured to generate a clock, which has one of first and second frequencies according to a selected one of gain values; a ramp signal generator configured to generate a ramp signal at an output node on a path between high and low voltage nodes and including: a current circuit configured to adjust, according to an edge of the clock, a level of current flowing on the path, and a resistor circuit configured to adjust, according to the selected gain value, a resistance between the output node and the low voltage node; and a signal converter configured to convert analog pixel signals to digital pixel signals according to the ramp signal, wherein the first frequency is lower than the second frequency, and wherein the first and second frequencies correspond to the selected gain value belonging to higher and lower groups of the gain values, respectively.

DETAILED DESCRIPTION

Various embodiments of the present disclosure are described below with reference to the accompanying drawings, in order to describe in detail the present disclosure so that those with ordinary skill in art to which the present disclosure pertains may easily carry out the technical spirit of the present disclosure.

It will be understood that when an element is referred to as being "connected to" or "coupled to" another element, the element may be directly connected to or coupled to the another element, or electrically connected to or coupled to the another element with one or more elements interposed therebetween. In addition, it will also be understood that the terms "comprises," "comprising," "includes," and "including" when used in this specification do not preclude the presence of one or more other elements, but may further include or have the one or more other elements, unless otherwise mentioned. In the description throughout the specification, some components are described in singular forms, but the present disclosure is not limited thereto, and it will be understood that the components may be formed in plural.

Figure 1:
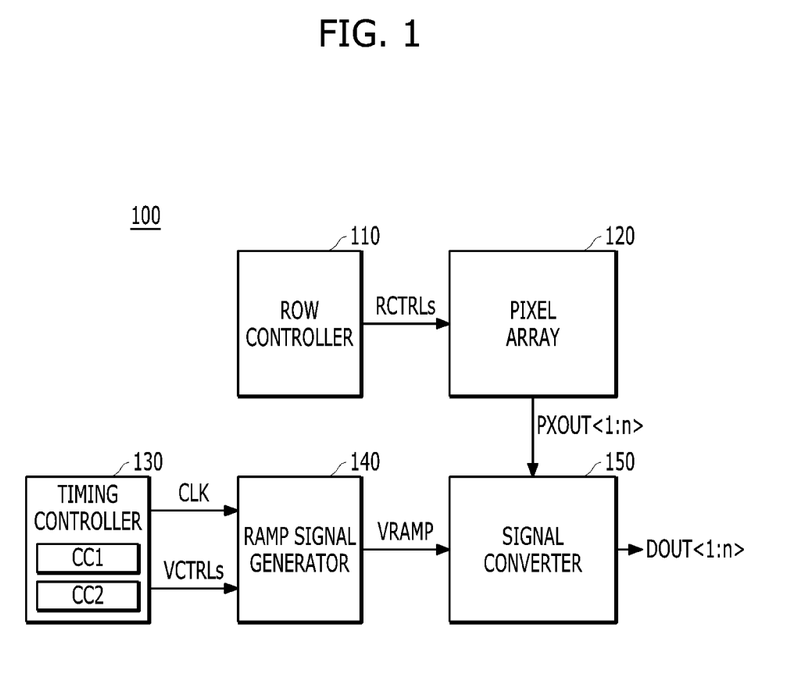
FIG. 1 is a block diagram illustrating an image sensor in accordance with an embodiment of the present disclosure.

FIG. 1 is a block diagram illustrating an image sensor 100 in accordance with an embodiment of the present disclosure.

Referring to FIG. 1, the image sensor 100 may include a row controller 110, a pixel array 120, a timing controller 130, a ramp signal generator 140 and a signal converter 150.

The row controller 110 may generate row control signals RCTRLs for controlling the pixel array 120 for each row. For example, the row controller 110 may generate first row control signals for controlling pixels arranged in a first row of the pixel array 120, and generate $y^{th}$ row control signals for controlling pixels arranged in a $y^{th}$ row of the pixel array 120, where "y" is a natural number greater than 2. The row control signals RCTRLs may include the first to $y^{th}$ row control signals.

The pixel array 120 may include a plurality of pixels (not illustrated) arranged at intersections of a plurality of rows and a plurality of columns. The plurality of pixels may output pixel signals PXOUT<1:n> through a plurality of column lines for each row, on the basis of the row control signals RCTRLs. For example, the pixels arranged in the first row among the plurality of pixels may generate the pixel signals PXOUT<1:n> for a first unit row time on the basis of the first row control signals, and the pixels arranged in the $y^{th}$ row among the plurality of pixels may generate the pixel signals PXOUT<1:n> for a $y^{th}$ unit row time on the basis of the $y^{th}$ row control signals.

The timing controller 130 may generate a plurality of control signals VCTRLs and a clock signal CLK according to an analog gain having a predetermined multiple range. For example, the predetermined multiple range may include multiple of 1 (AG×1) to multiple of 64 (AG×64). For example, the timing controller 130 may generate the plurality of control signals VCTRLs corresponding to the analog gain, and generate the clock signal CLK having a frequency corresponding to the analog gain.

The timing controller 130 may include a first control circuit CC1 and a second control circuit CC2. The first control circuit CC1 may generate the plurality of control signals VCTRLs according to the analog gain. For example, the first control circuit CC1 may generate the plurality of control signals VCTRLs, which correspond to any multiple included in the predetermined multiple range, on the basis of the analog gain. The second control circuit CC2 may generate the clock signal CLK according to the analog gain. For example, the second control circuit CC2 may generate the clock signal CLK having a first frequency when the analog gain has a first range in the predetermined multiple range, and generate the clock signal CLK having a second frequency when the analog gain has a second range in the predetermined multiple range. The second range may include relatively low multiples of the predetermined multiple range. For example, the second range may include the multiple of 1 (AG×1) to multiple of 32 (AG×3) among the multiple of 1 (AG×1) to the multiple of 64 (AG×64). The first range may include relatively high multiples of the predetermined multiple range. For example, the first range may include multiple of 33 (AG×33) to the multiple of 64 (AG×64) among the multiple of 1 (AG×1) to the multiple of 64 (AG×64). The second frequency may be a relatively high frequency, and the first frequency may be a relatively low frequency. For example, the first frequency may be a frequency corresponding to half (½) of the second frequency.

The ramp signal generator 140 may generate a ramp signal VRAMP having a slope corresponding to the analog gain, on the basis of the plurality of control signals VCTRLs and the clock signal CLK. For example, the ramp signal generator 140 may generate the ramp signal VRAMP through an output terminal VOUT of the ramp signal VRAMP by adjusting both of a resistance value applied to the output terminal VOUT and a change rate of a current level applied to the output terminal VOUT when the analog gain has the first range in the predetermined multiple range, and may generate the ramp signal VRAMP through the output terminal VOUT by adjusting only the resistance value between the resistance value and the change rate of the current level when the analog gain has the second range in the predetermined multiple range. That is, the ramp signal generator 140 may adjust the resistance value in a state in which the change rate of the current level is set to a first value (i.e., a fixed value or a default value), on the basis of the clock signal CLK having the high frequency when the analog gain has the second range, and may adjust the resistance value in a state in which the change rate of the current level is set to a second value (i.e., a changed value or a variable value), on the basis of the clock signal CLK having the low frequency when the analog gain has the first range.

The signal converter 150 may convert the analog-type pixel signals PXOUT<1:n> to digital-type pixel signals DOUT<1:n>, on the basis of the ramp signal VRAMP and the pixel signals PXOUT<1:n>. For example, the signal converter 150 may include a plurality of analog to digital converters (ADCs) corresponding to the plurality of columns.

Figure 2:
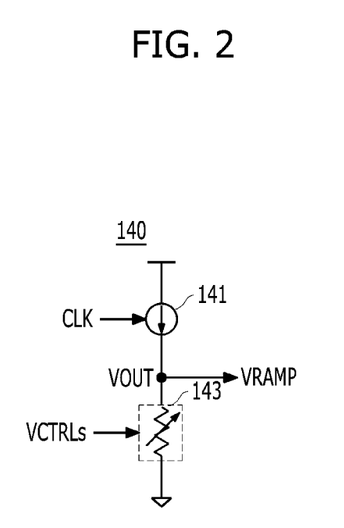
FIG. 2 is a block diagram illustrating a ramp signal generator illustrated in FIG. 1 in accordance with an embodiment of the present disclosure.

FIG. 2 is a block diagram illustrating an example of the ramp signal generator 140 illustrated in FIG. 1 in accordance with an embodiment of the present disclosure.

Referring to FIG. 2, the ramp signal generator 140 may include a current circuit 141 and a resistance circuit 143.

The current circuit 141 may be coupled to a high voltage terminal and the output terminal VOUT. The current circuit 141 may adjust the current level applied to the output terminal VOUT and the change rate of the current level on the basis of the clock signal CLK. For example, the current circuit 141 may adjust the current level according to a specific edge, i.e., a rising edge or a falling edge, of the clock signal CLK, and adjust the change rate of the current level according to the frequency of the clock signal CLK. The current level may correspond to a ramping direction of the ramp signal VRAMP, and the change rate of the current level may correspond to the slope of the ramp signal VRAMP.

The resistance circuit 143 may be coupled to a low voltage terminal and the output terminal VOUT. The resistance circuit 143 may adjust the resistance value applied to the output terminal VOUT, on the basis of the plurality of control signals VCTRLs. The resistance value may correspond to the slope of the ramp signal VRAMP.

Figure 3:
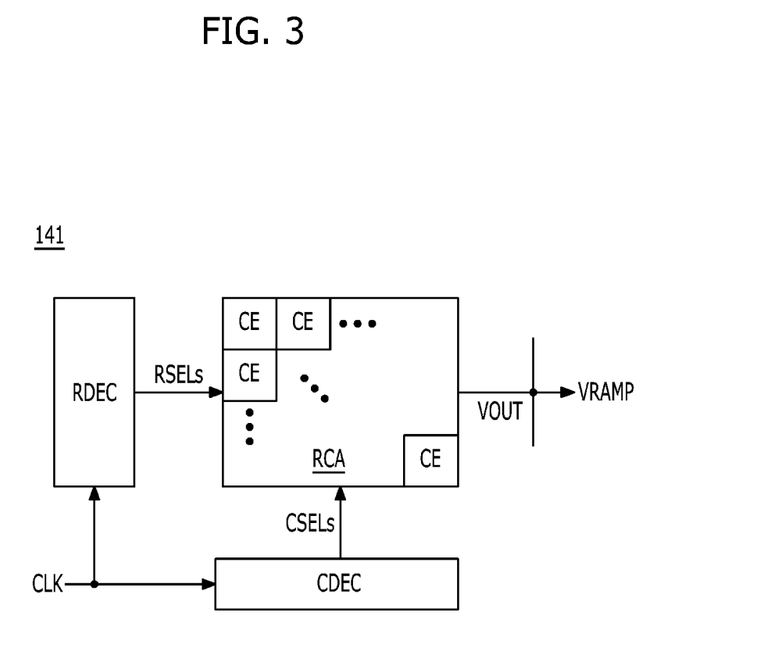
FIG. 3 is a block diagram illustrating a current circuit illustrated in FIG. 2 in accordance with an embodiment of the present disclosure.

FIG. 3 is a block diagram illustrating an example of the current circuit 141 illustrated in FIG. 2 in accordance with an embodiment of the present disclosure.

Referring to FIG. 3, the current circuit 141 may include a row decoder RDEC, a column decoder CDEC and a current cell array RCA.

The row decoder RDEC may generate a plurality of row selection signals RSELs on the basis of the clock signal CLK. For example, the row decoder RDEC may activate all of the plurality of row selection signals RSELs, and then sequentially deactivate the plurality of row selection signals RSELs.

The column decoder CDEC may generate a plurality of column selection signals CSELs on the basis of the clock signal CLK. For example, the column decoder CDEC may activate all of the plurality of column selection signals CSELs, and then sequentially deactivate the plurality of column selection signals CSELs.

The current cell array RCA may sequentially adjust the current level of the ramp signal VRAMP applied to the output terminal VOUT of the ramp signal VRAMP and adjust the change rate of the current level, on the basis of the plurality of row selection signals RSELs and the plurality of column selection signals CSELs. The current cell array RCA may include a plurality of current cells CE arranged at intersections of a plurality of rows and a plurality of columns. The plurality of current cells CE may be selected based on the plurality of row selection signals RSELs and the plurality of column selection signals CSELs. For example, the plurality of current cells CE may be all enabled on the basis of the plurality of activated row selection signals RSELs and the plurality of activated column selection signals CSELs, and then be sequentially disabled on the basis of the plurality of row selection signals RSELs that are sequentially deactivated and the plurality of column selection signals CSELs that are sequentially deactivated. The numbers of enabled and disabled current cells CE may be related to the current level of the ramp signal VRAMP, and an interval at which each of the current cells CE changes from an enabled state to a disabled state may be related to the slope of the ramp signal VRAMP.

Although the present embodiment includes the row decoder RDEC and the column decoder CDEC, the present embodiment is not limited thereto, and may include only one of the row decoder RDEC and the column decoder CDEC depending on an arrangement structure of the current cell array RCA.

Figure 4:
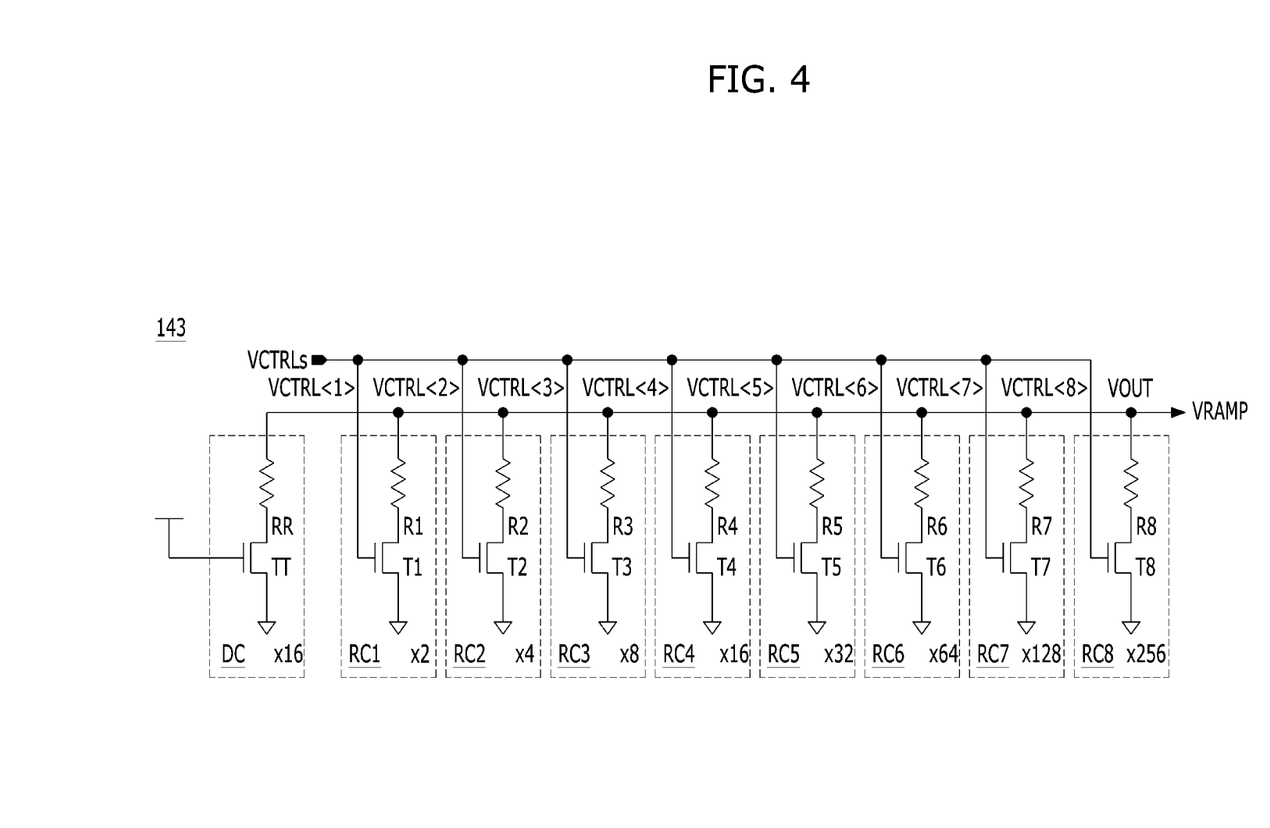
FIG. 4 is a circuit diagram illustrating a resistance circuit illustrated in FIG. 2 in accordance with an embodiment of the present disclosure.

FIG. 4 is a circuit diagram illustrating an example of the resistance circuit 143 illustrated in FIG. 2 in accordance with an embodiment of the present disclosure.

Referring to FIG. 4, the resistance circuit 143 may include a fixed resistance cell DC and a plurality of variable resistance cells RC1 to RC8. Hereinafter, the plurality of variable resistance cells RC1 to RC8 are described as first to eighth variable resistance cells RC1 to RC8, and the plurality of control signals VCTRLs are described as first to eighth control signals VCTRL<1:8>.

The fixed resistance cell DC may apply a fixed resistance value to the output terminal VOUT. That is, the fixed resistance cell DC may apply the fixed resistance value to the output terminal VOUT as a default value. For example, the fixed resistance cell DC may include a resistor RR and a switch TT. The resistor RR may be coupled between the output terminal VOUT and the switch TT. The resistor RR may have the fixed resistance value. The switch TT may be coupled between the resistor RR and the low voltage terminal. The switch TT may include a transistor having a gate terminal coupled to the high voltage terminal and a source terminal and a drain terminal coupled between the resistor RR and the low voltage terminal. Reference numeral "×16" may refer to the number of fixed resistance cells DC coupled in parallel to the output terminal VOUT.

The first variable resistance cell RC1 may selectively apply a first resistance value to the output terminal VOUT on the basis of the first control signal VCTRL<1>. That is, the first variable resistance cell RC1 may additionally apply a first variable resistance value to the output terminal VOUT. For example, the first variable resistance cell RC1 may include a first resistor R1 and a first switch T1. The first resistor R1 may be coupled between the output terminal VOUT and the first switch T1. The first resistor R1 may have the first resistance value. The first switch T1 may be coupled between the first resistor R1 and the low voltage terminal. The first switch T1 may include a first transistor having a gate terminal receiving the first control signal VCTRL<1> and a source terminal and a drain terminal coupled between the first resistor R1 and the low voltage terminal. Reference numeral "×2" may refer to the number of first variable resistance cells RC1 coupled to the output terminal VOUT.

The second variable resistance cell RC2 may selectively apply a second resistance value to the output terminal VOUT on the basis of the second control signal VCTRL<2>. That is, the second variable resistance cell RC2 may additionally apply a second variable resistance value to the output terminal VOUT. For example, the second variable resistance cell RC2 may include a second resistor R2 and a second switch T2. The second resistor R2 may be coupled between the output terminal VOUT and the second switch T2. The second resistor R2 may have the second resistance value. The second switch T2 may be coupled between the second resistor R2 and the low voltage terminal. The second switch T2 may include a second transistor having a gate terminal receiving the second control signal VCTRL<2> and a source terminal and a drain terminal coupled between the second resistor R2 and the low voltage terminal. Reference numeral "×4" may refer to the number of second variable resistance cells RC2 coupled in parallel to the output terminal VOUT.

The third variable resistance cell RC3 may selectively apply a third resistance value to the output terminal VOUT on the basis of the third control signal VCTRL<3>. That is, the third variable resistance cell RC3 may additionally apply a third variable resistance value to the output terminal VOUT. For example, the third variable resistance cell RC3 may include a third resistor R3 and a third switch T3. The third resistor R3 may be coupled between the output terminal VOUT and the third switch T3. The third resistor R3 may have the third resistance value. The third switch T3 may be coupled between the third resistor R3 and the low voltage terminal. The third switch T3 may include a third transistor having a gate terminal receiving the third control signal VCTRL<3> and a source terminal and a drain terminal coupled between the third resistor R3 and the low voltage terminal. Reference numeral "×8" may refer to the number of third variable resistance cells RC3 coupled to the output terminal VOUT.

The fourth variable resistance cell RC4 may selectively apply a fourth resistance value to the output terminal VOUT on the basis of the fourth control signal VCTRL<4>. That is, the fourth variable resistance cell RC4 may additionally apply a fourth variable resistance value to the output terminal VOUT. For example, the fourth variable resistance cell RC4 may include a fourth resistor R4 and a fourth switch T4. The fourth resistor R4 may be coupled between the output terminal VOUT and the fourth switch T4. The fourth resistor R4 may have the fourth resistance value. The fourth switch T4 may be coupled between the fourth resistor R4 and the low voltage terminal. The fourth switch T4 may include a fourth transistor having a gate terminal receiving the fourth control signal VCTRL<4> and a source terminal and a drain terminal coupled between the fourth resistor R4 and the low voltage terminal. Reference numeral "×16" may refer to the number of fourth variable resistance cells RC4 coupled to the output terminal VOUT.

The fifth variable resistance cell RC5 may selectively apply a fifth resistance value to the output terminal VOUT on the basis of the fifth control signal VCTRL<5>. That is, the fifth variable resistance cell RC5 may additionally apply a fifth variable resistance value to the output terminal VOUT. For example, the fifth variable resistance cell RC5 may include a fifth resistor R5 and a fifth switch T5. The fifth resistor R5 may be coupled between the output terminal VOUT and the fifth switch T5. The fifth resistor R5 may have the fifth resistance value. The fifth switch T5 may be coupled between the fifth resistor R5 and the low voltage terminal. The fifth switch T5 may include a fifth transistor having a gate terminal receiving the fifth control signal VCTRL<5> and a source terminal and a drain terminal coupled between the fifth resistor R5 and the low voltage terminal. Reference numeral "×32" may refer to the number of fifth variable resistance cells RC5 coupled to the output terminal VOUT.

The sixth variable resistance cell RC6 may selectively apply a sixth resistance value to the output terminal VOUT on the basis of the sixth control signal VCTRL<6>. That is, the sixth variable resistance cell RC6 may additionally apply a sixth variable resistance value to the output terminal VOUT. For example, the sixth variable resistance cell RC6 may include a sixth resistor R6 and a sixth switch T6. The sixth resistor R6 may be coupled between the output terminal VOUT and the sixth switch T6. The sixth resistor R6 may have the sixth resistance value. The sixth switch T6 may be coupled between the sixth resistor R6 and the low voltage terminal. The sixth switch T6 may include a sixth transistor having a gate terminal receiving the sixth control signal VCTRL<6> and a source terminal and a drain terminal coupled between the sixth resistor R6 and the low voltage terminal. Reference numeral "×64" may refer to the number of sixth variable resistance cells RC6 coupled to the output terminal VOUT.

The seventh variable resistance cell RC7 may selectively apply a seventh resistance value to the output terminal VOUT on the basis of the seventh control signal VCTRL<7>. That is, the seventh variable resistance cell RC7 may additionally apply a seventh variable resistance value to the output terminal VOUT. For example, the seventh variable resistance cell RC7 may include a seventh resistor R7 and a seventh switch T7. The seventh resistor R7 may be coupled between the output terminal VOUT and the seventh switch T7. The seventh resistor R7 may have the seventh resistance value. The seventh switch T7 may be coupled between the seventh resistor R7 and the low voltage terminal. The seventh switch T7 may include a seventh transistor having a gate terminal receiving the seventh control signal VCTRL<7> and a source terminal and a drain terminal coupled between the seventh resistor R7 and the low voltage terminal. Reference numeral "×128" may refer to the number of seventh variable resistance cells RC7 coupled to the output terminal VOUT.

The eighth variable resistance cell RC8 may selectively apply an eighth resistance value to the output terminal VOUT on the basis of the eighth control signal VCTRL<8>. That is, the eighth variable resistance cell RC8 may additionally apply an eighth variable resistance value to the output terminal VOUT. For example, the eighth variable resistance cell RC8 may include an eighth resistor R8 and an eighth switch T8. The eighth resistor R8 may be coupled between the output terminal VOUT and the eighth switch T8. The eighth resistor R8 may have the eighth resistance value. The eighth switch T8 may be coupled between the eighth resistor R8 and the low voltage terminal. The eighth switch T8 may include an eighth transistor having a gate terminal receiving the eighth control signal VCTRL<8> and a source terminal and a drain terminal coupled between the eighth resistor R8 and the low voltage terminal. Reference numeral "×256" may refer to the number of eighth variable resistance cells RC8 coupled to the output terminal VOUT.

Hereinafter, an operation of the image sensor 100 in accordance with an embodiment, which has the above-described configuration, is described.

The pixel array 120 may output the pixel signals PXOUT<1:n> through the plurality of column lines on the basis of the row control signals RCTRLs. For example, the pixel array 120 may generate the pixel signals PXOUT<1:n>, which correspond to the pixels arranged in the first row, for the first unit row time on the basis of the first row control signals among the row control signals RCTRLs, and may generate the pixel signals PXOUT<1:n>, which correspond to the pixels arranged in the $y^{th}$ row, for the $y^{th}$ unit row time on the basis of the $y^{th}$ row control signals among the row control signals RCTRLs.

The timing controller 130 may generate the plurality of control signals VCTRLs and the clock signal CLK according to the analog gain. For example, the timing controller 130 may generate the plurality of control signals VCTRLs and the clock signal CLK as shown in the following "Table 1" according to the analog gain.

TABLE 1

| No. | Control Target | Analog Gain | CLK | VCTRLs |
|---|---|---|---|---|
| 1 | Resistance Value | AGx1~AGx32 | High Frequency | VCTRL<1:8> |
| 2 | Resistance Value + Frequency | AGx33~AGx64 | Low Frequency | VCTRL<1:8> |

When the analog gain has one of multiple of 1 (AG×1) to multiple of 32 (AG×32) included in the second range, the timing controller 130 may generate the clock signal CLK having the high frequency as a default value, and generate the plurality of control signals VCTRLs so that only the resistance value applied to the output terminal VOUT is adjusted. For example, when the analog gain has one of multiple of 1 (AG×1) to multiple of 32 (AG×32) included in the second range, the timing controller 130 may combine the plurality of control signals VCTRL<1:8> according to the analog gain having the multiples while the clock signal CLK is fixed to the high frequency.

When the analog gain has one of multiple of 33 (AG×33) to multiple of 64 (AG×64) included in the first range, the timing controller 130 may generate the clock signal CLK having the low frequency, and generate the plurality of control signals VCTRLs so that the resistance value applied to the output terminal VOUT is adjusted. For example, when the analog gain has one of multiple of 33 (AG×33) to multiple of 64 (AG×64) included in the first range, the timing controller 130 may combine the plurality of control signals VCTRL<1:8> according to the analog gain having the multiples while the clock signal CLK is changed to the low frequency. The low frequency may be a frequency corresponding to half (½) of the high frequency.

The ramp signal generator 140 may generate the ramp signal VRAMP having a slope corresponding to the analog gain, on the basis of the plurality of control signals VCTRLs and the clock signal CLK. For example, when the analog gain has one of multiple of 1 (AG×1) to multiple of 32 (AG×32) included in the second range, the ramp signal generator 140 may adjust the resistance value applied to the output terminal VOUT of the ramp signal VRAMP while the change rate of the current level applied to the output terminal VOUT is fixed to the default value, thereby generating the ramp signal VRAMP having a slope, which corresponds to the multiples, through the output terminal VOUT. When the analog gain has one of multiple of 33 (AG×33) to multiple of 64 (AG×64) included in the first range, the ramp signal generator 140 may adjust the resistance value applied to the output terminal VOUT of the ramp signal VRAMP while the change rate of the current level applied to the output terminal VOUT is changed, thereby generating the ramp signal VRAMP having a slope, which corresponds to the multiples, through the output terminal VOUT.

The ramp signal generator 140 may adjust the resistance value applied to the output terminal VOUT of the ramp signal VRAMP, on the basis of the following "Equation 1".

$$AG = \frac{N}{16} + 1 \quad \text{[Equation 1]}$$

Herein, "AG" may refer to the analog gain, "N" may refer to the number of variable resistance cells selected from the total number of the first to eighth variable resistance cells RC1 to RC8, and "1(=16/16)" may refer to the fixed resistance cell DC.

For example, when none of the first to eighth variable resistance cells RC1 to RC8 is selected, that is, all of the plurality of control signals VCTRL<1:8> are deactivated, the ramp signal generator 140 may apply only the fixed resistance value of the fixed resistance cell DC to the output terminal VOUT of the ramp signal VRAMP, thereby generating the ramp signal VRAMP having a slope corresponding to the analog gain having the multiple of 1 (AG×1).

The signal converter 150 may convert the analog-type pixel signals PXOUT<1:n> into the digital-type pixel signals DOUT<1:n> on the basis of the ramp signal VRAMP and the pixel signals PXOUT<1:n>.

Figure 5:
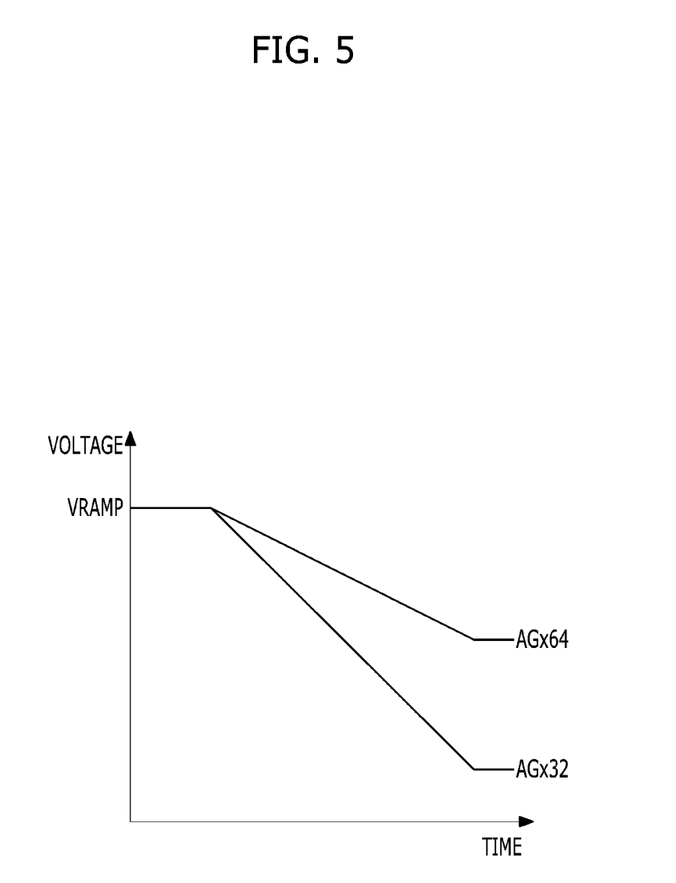
FIG. 5 is a graph diagram illustrating a ramp signal illustrated in FIG. 1 in accordance with an embodiment of the present disclosure.

FIG. 5 is a graph diagram illustrating the ramp signal VRAMP in accordance with an embodiment of the present disclosure.

Referring to FIG. 5, the ramp signal VRAMP may have a slope corresponding to the analog gain. For example, when the analog gain has multiple of 32 (AG×32), the ramp signal VRAMP may have a relatively steep slope, and when the analog gain has multiple of 64 (AG×64), the ramp signal VRAMP may have a relatively gentle slope.

When the analog gain has the multiple of 32 (AG×32), the ramp signal generator 140 may adjust only the resistance value while the change rate of the current level, that is, the frequency of the clock signal CLK, is fixed to the default value, and generate the ramp signal VRAMP having a relatively steep slope. When the analog gain has the multiple of 64 (AG×64), the ramp signal generator 140 may adjust the resistance value while the change rate of the current level, that is, the frequency of the clock signal CLK, is changed, and generate the ramp signal VRAMP having a relatively gentle slope.

According to an embodiment of the present disclosure, a resistance value and a change rate of a current level, that is, a frequency of a clock signal, which are applied to an output terminal of a ramp signal, may be properly combined and adjusted according to an analog gain, which makes it possible to generate an optimized ramp signal.

An embodiment of the present disclosure has an advantageous effect in area by configuring a circuit, i.e., a ramp signal generator, for generating an optimized ramp signal when an analog gain is adjusted.

While the present disclosure has been illustrated and described with respect to specific embodiments, the disclosed embodiments are provided for the description, and not intended to be restrictive. Further, it is noted that the present disclosure may be achieved in various ways through substitution, change, and modification that fall within the scope of the following claims, as those skilled in the art will recognize in light of the present disclosure. Furthermore, the claims may be combined to form additional claims.

What is claimed is:

1. A ramp signal generator comprising:
   a resistance circuit coupled to a first voltage terminal and an output terminal and suitable for adjusting, according to a plurality of control signals, a resistance value applied to the output terminal, a ramp signal being output through the output terminal; and
   a current circuit coupled to a second voltage terminal and the output terminal and suitable for adjusting, according to a clock signal, a current level applied to the output terminal and a change rate of the current level,
   wherein the plurality of control signals are generated according to an analog gain having a predetermined multiple range, and
   wherein the clock signal has a first frequency when the analog gain has a first range within the predetermined multiple range and has a second frequency when the analog gain has a second range within the predetermined multiple range.

2. The ramp signal generator of claim 1, wherein the resistance circuit includes:
   a first resistance cell suitable for applying a fixed resistance value to the output terminal; and
   a plurality of second resistance cells suitable for applying a variable resistance value to the output terminal on the basis of the plurality of control signals.

3. The ramp signal generator of claim 1, wherein the current circuit includes:
   a decoder suitable for generating a plurality of selection signals on the basis of the clock signal; and
   a current cell array suitable for sequentially adjusting the current level and adjusting the change rate of the current level, on the basis of the plurality of selection signals.

4. The ramp signal generator of claim 1, wherein the first range includes relatively high multiples and the second range includes relatively low multiples, within the predetermined multiple range.

5. The ramp signal generator of claim 1, wherein the first frequency is higher than the second frequency.

6. An image sensor comprising:
   a pixel array suitable for generating pixel signals;
   a ramp signal generator suitable for:
      generating a ramp signal through an output terminal by adjusting, according to a plurality of control signals and a clock signal, a resistance value applied to the output terminal and a change rate of a current level applied to the output terminal when an analog gain has a first range within a predetermined multiple range, and
      generating the ramp signal through the output terminal by adjusting, according to the plurality of control signals and the clock signal, only the resistance value when the analog gain has a second range in the predetermined multiple range; and
   a signal converter suitable for reading out the pixel signals on the basis of the ramp signal.

7. The image sensor of claim 6, wherein the ramp signal generator sets the change rate of the current level to a first value on the basis of the clock signal having a relatively high frequency when the analog gain has the second range and sets the change rate of the current level to a second value on the basis of the clock signal having a relatively low frequency when the analog gain has the first range.

8. The image sensor of claim 6, wherein the ramp signal generator includes:
   a resistance circuit coupled to a first voltage terminal and the output terminal and suitable for adjusting, on the basis of the plurality of control signals, the resistance value applied to the output terminal; and a current circuit coupled to a second voltage terminal and the output terminal and suitable for adjusting, on the basis of the clock signal, the current level applied to the output terminal and the change rate of the current level.

9. The image sensor of claim 8, wherein the resistance circuit includes:

a first resistance cell suitable for applying a fixed resistance value to the output terminal; and a plurality of second resistance cells suitable for applying a variable resistance value to the output terminal on the basis of the plurality of control signals.

10. The image sensor of claim 8, wherein the current circuit includes:

a decoder suitable for generating a plurality of selection signals on the basis of the clock signal; and a current cell array suitable for sequentially adjusting the current level applied to the output terminal and adjusting the change rate of the current level, on the basis of the plurality of selection signals.

11. The image sensor of claim 6, further comprising a timing controller suitable for generating the plurality of control signals according to the analog gain.

12. The image sensor of claim 11, wherein the timing controller includes:

a first control circuit suitable for generating the plurality of control signals according to the analog gain having the predetermined multiple range; and a second control circuit suitable for generating the clock signal having a first frequency when the analog gain has the first range within the predetermined multiple range and generating the clock signal having a second frequency when the analog gain has the second range within the predetermined multiple range.

13. An image sensor comprising:

a timing controller configured to generate a clock, which has one of first and second frequencies according to a selected one of gain values;

a ramp signal generator configured to generate a ramp signal at an output node on a path between high and low voltage nodes and including:

a current circuit configured to adjust, according to an edge of the clock, a level of current flowing on the path, and a resistor circuit configured to adjust, according to the selected gain value, a resistance between the output node and the low voltage node; and a signal converter configured to convert analog pixel signals to digital pixel signals according to the ramp signal, wherein the first frequency is lower than the second frequency, and wherein the first and second frequencies correspond to the selected gain value belonging to higher and lower groups of the gain values, respectively.

* * * * *